United States Patent [19]
Kim

[11] Patent Number: 6,078,686
[45] Date of Patent: Jun. 20, 2000

[54] IMAGE QUALITY ENHANCEMENT CIRCUIT AND METHOD THEREFOR

[75] Inventor: Yeong-taeg Kim, Suwon, Rep. of Korea

[73] Assignee: Samsung Electronics Co., Ltd., Kyungki-do, Rep. of Korea

[21] Appl. No.: 08/941,669

[22] Filed: Sep. 30, 1997

[30] Foreign Application Priority Data

Sep. 30, 1996 [KR] Rep. of Korea ................. 96-43133

[51] Int. Cl.[7] ............................. G06K 9/00; G06K 9/40
[52] U.S. Cl. ................... 382/167; 382/168; 382/260; 382/270; 382/274; 358/463; 358/518
[58] Field of Search .................. 382/162, 166, 382/167, 168, 169, 172, 254, 260–265, 270–275; 348/606, 607, 609, 612, 671–675, 678, 683; 358/447, 448, 455, 443, 463, 466, 518–522

[56] References Cited

U.S. PATENT DOCUMENTS

| | | | |
|---|---|---|---|
| 4,812,903 | 3/1989 | Wagensonner et al. | 358/521 |
| 4,825,297 | 4/1989 | Fuchsberger et al. | 358/447 |
| 4,991,092 | 2/1991 | Greensite | 382/131 |
| 5,857,033 | 1/1999 | Kim | 382/168 |
| 5,862,254 | 1/1999 | Kim et al. | 382/168 |
| 5,937,090 | 8/1999 | Kim | 382/169 |
| 5,963,665 | 10/1999 | Kim et al. | 382/169 |

*Primary Examiner*—Bhavesh Mehta
*Attorney, Agent, or Firm*—Sughrue, Mion, Zinn, Macpeak & Seas, PLLC

[57] ABSTRACT

According to an image quality enhancing circuit and a method therefor, an impulse for each of an input luminance and color signals is detected. A trimmed mean of a predetermined-sized window is output when the impulse is detected. Otherwise, the input signals are bypassed. Accordingly, noise-reduced luminance and color signals are output. An enhanced luminance signal is output by receiving the noise-reduced luminance signal in a picture unit and independently equalizing histograms for subimages divided on the basis of the mean value of the received luminance signal. A local contrast defined as a difference between the value of an input sample with respect to the enhanced luminance signal and each value obtained by low-pass filtering the samples in a predetermined-sized window including the input sample, and the input sample value is adaptively weighted according to the detected local contrast, so that a changed luminance signal is output. A compensated color signal is output by compensating the noise-reduced color signal according to the changed luminance signal. Thus, impulse noise is effectively removed, and an undistorted color signal is provided while enhancing the contrast of the luminance signal, so that the image quality is greatly improved.

66 Claims, 9 Drawing Sheets

IMAGE QUALITY ENHANCEMENT CIRCUIT AND METHOD THEREFOR

BACKGROUND OF THE INVENTION

The present invention relates to image quality enhancement, and more particularly, to an image quality enhancing circuit having functions such as noise reduction, contrast enhancement based on histogram equalization, local contrast enhancement and color compensation, and a method therefor.

In general, the image quality of a video signal can be deteriorated due to various factors. Low contrast is a factor in video signal and image quality degradation, but is only one among several factors. Gamma correction is a method for correcting image quality degradation involving correction according to a variation in brightness, histogram equalization, etc.

The principal operation of the histogram equalization is to convert a given input image on the basis of the histogram of the input image. Here, the histogram represents gray level distribution at a given input image. Such a gray level histogram provides an entire depiction on the appearance of an image. A gray level appropriately adjusted according to the sample distribution of an image enhances the appearance and contrast of the image.

The histogram equalization for enhancing the contrast of a given image according to sample distribution of the image is the most widely known among various contrast enhancing methods, and is fully discussed in the following documents: [1] J. S. Lim, "Two-Dimensional Signal and Image Processing," Prentice Hall, Englewood Cliffs, N.J., 1990; and [2] R. C. Gonzalez and P. Wints, "Digital Image Processing," Addison-Wesley, Reading, Mass., 1977, both of which are hereby incorporated in their entirety for reference as useful background material.

Also, useful applications of the histogram equalization including medical image processing and radar image processing are discussed in the following documents, each of which also is incorporated in its entirety for useful background: [3] J. Zimmerman, S. Pizer, E. Staab, E. Perry, W. McCartney, and B. Brenton, "Evaluation of the effectiveness of adaptive histogram equalization for contrast enhancement," IEEE Tr.on Medical Imaging, pp. 304–312, Dec. 1998; and [4] Y. Li, W. Wang, and D. Y. Yu, "Application of adaptive histogram equalization to x-ray chest image," Proc. of the SPIE, pp. 513–514, vol. 2321,1994. Accordingly, a technique using the histogram of a given image has been usefully applied to various fields such as medical image processing, infrared ray image processing, and radar image processing.

In general, since the histogram equalization has an effect of stretching a dynamic range, it flattens the distribution density of a resultant image. Therefore, the contrast of the image is enhanced. Such a well-known characteristic of the histogram equalization, however, becomes a defect in some actual cases. That is, because histogram equalization flattens the image output density, the average brightness of the output image approaches a middle gray level. In practice, for histogram equalization of an analog image, the average brightness of an output image in the histogram equalization is exactly the middle gray level regardless of the average brightness of an input image. Obviously, the above-described characteristic is not desirable for the practical application. As an example of this problem, a scene photographed at night looks too bright after the histogram equalization is generated.

Impulse noise is another factor of image quality degradation. The independent impulse noise is uniformly distributed on a frequency region. As a result, an application of a simple linear filter causes details of an image to blur, and thus a high frequency component of the impulse noise is not effectively removed.

Still another factor causing image quality degradation is that the gamma correction or the histogram equalization for enhancing low contrast enhances an entire contrast of a video signal, but is not very effective for the enhancement of a contrast at detailed portions being visually more important information, i.e., a local contrast.

Yet another factor causing image quality degradation is color compensation. Unless color compensation is performed on a color signal according to a variation in luminance (occurring when a predetermined luminance processing such as the histogram equalization is performed on a luminance signal) to enhance contrast, a primary color signal is distorted.

SUMMARY OF THE INVENTION

Accordingly, it is an object of the present invention to provide an image quality enhancing circuit having such functions as noise reduction, contrast enhancement based on mean-separation histogram equalization, local contrast enhancement, and color compensation.

It is another object of the present invention to provide an image quality enhancing method having such functions as noise reduction, contrast enhancement based on mean-separation histogram equalization, local contrast enhancement, and color compensation.

To accomplish the first object, in an image quality enhancing circuit according to the present invention, a noise reducing means detects an impulse for each of an input luminance signal and input color signals and outputs a trimmed mean of a predetermined size window when the impulse is detected, and otherwise, bypassing the input signals without change. A contrast enhancing means independently equalizes a luminance signal of a picture unit output by the noise reducer by obtaining a histogram of subimages divided on the basis of the mean value of the luminance signal and outputs an enhanced luminance signal. A local contrast enhancing means detects a local contrast defined as a difference between the value of an input sample with respect to the enhanced luminance signal and each value obtained by low-pass filtering samples in a predetermined size window including the input sample, adaptively weights the input sample value according to the detected local contrast, and outputs a changed luminance signal. Also, a color compensating means compensates the color signals output by the noise reducing means according to the changed luminance signal.

To accomplish the second object, an image quality enhancing method according to the present invention comprises the steps of: detecting an impulse for each of input luminance and color signals, outputting a trimmed mean of a predetermined-sized window when the impulse is detected, and bypassing the input signals when the impulse is not detected, thereby outputting noise-reduced luminance and color signals; receiving the noise-reduced luminance signal in a picture unit, independently equalizing the noise-reduced luminance signal using the histograms of subimages divided on the basis of the mean value of the noise-reduced luminance signal, and outputting an enhanced luminance signal; detecting a local contrast defined as a difference between an input sample value with respect to the enhanced luminance signal and each value obtained by low-pass filtering the samples of a predetermined-sized window including the input sample, and outputting a luminance signal changed by adaptively weighting the input sample value according to the detected local contrast; and compensating the noise-reduced color signal according to the changed luminance signal and outputting a compensated color signal.

BRIEF DESCRIPTION OF THE DRAWINGS

The above objects and advantages of the present invention will become more apparent when understood in the light of the following detailed description of a preferred embodiment thereof with reference to the attached drawings in which.

DETAILED DESCRIPTION OF THE PREFERRED EMBODIMENTS

Figure 1:
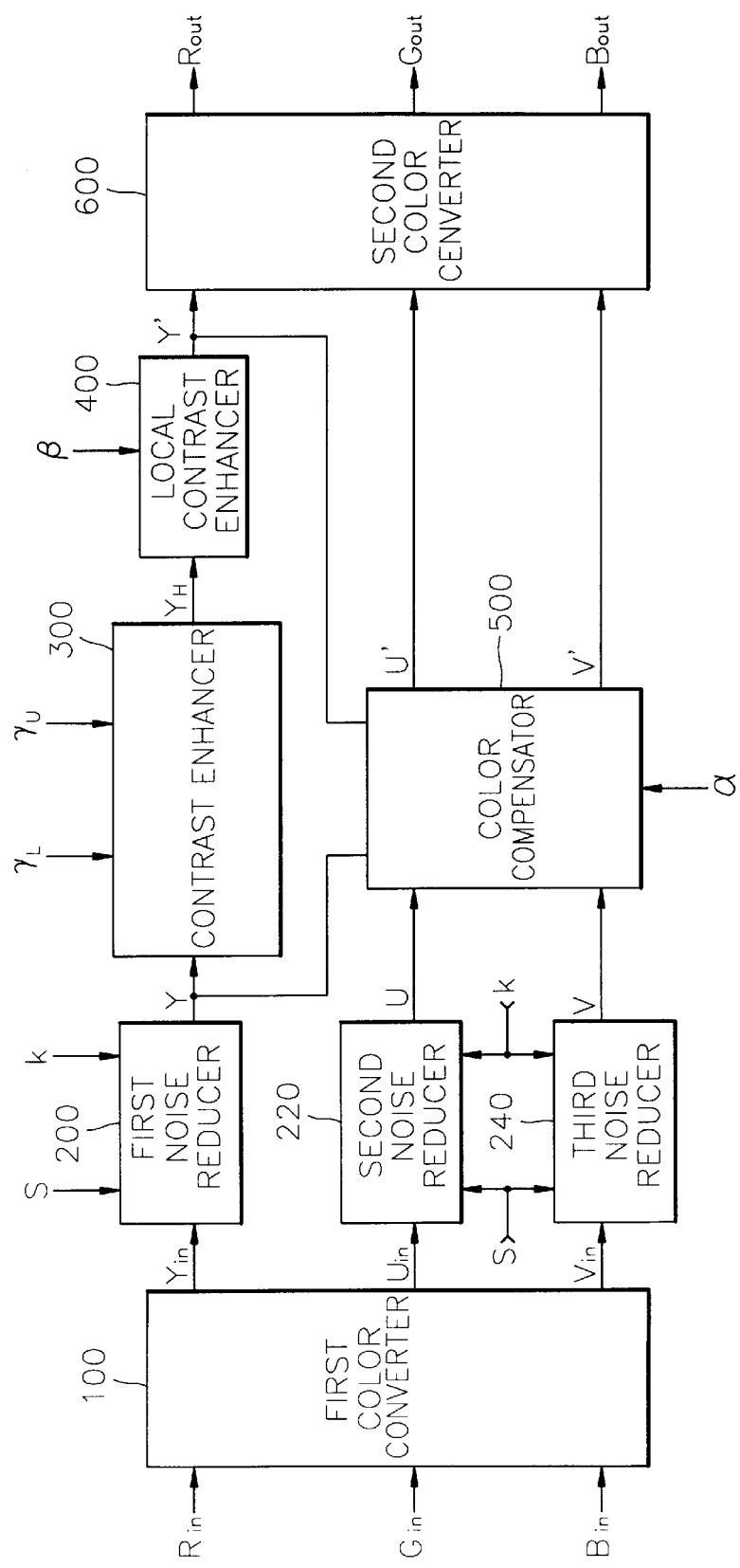
FIG. 1 is a block diagram of an image quality enhancing circuit according to an embodiment of the present invention.

Referring to FIG. 1, a first color converter 100 receives baseband digital color signals indicated by $R_{in}$, $G_{in}$ and $B_{in}$ and converts them into a digital luminance signal and system-defined color signals which are indicated by $Y_{in}$, $U_{in}$ and $V_{in}$.

Here, R, G and B signals can be converted into various different color signals like (Y, I, Q), (Y, U, V) and (Y, R-Y, B-Y) color systems according to a signal processing method. The relationship between the R, G and B signals and new color signals Y, U and V can be expressed by following equation 1.

$$\begin{bmatrix} Y \\ U \\ V \end{bmatrix} = \begin{bmatrix} a_1 & a_1 & a_1 \\ b_1 & b_2 & b_3 \\ c_1 & c_2 & c_3 \end{bmatrix} \begin{bmatrix} R \\ G \\ B \end{bmatrix} \quad (1)$$

In the present invention, (Y,U,V) is defined by a color system, Y denotes a luminance signal, and U and V represent system-defined color signals.

A first function of an image quality enhancing circuit is to remove impulse noise. First to third noise reducers 200, 220 and 240 detect an outer value based on statistics of samples and trim the result in order to remove impulse noise, respectively. In other words, the first to third noise reducers 200, 220 and 240 output the trimmed mean of a given window when the impulse has been detected from an input sample, otherwise, they bypass the input sample.

Also, statistics of the samples calculated by two windows of different sizes are useful to reduce the detection failure of the impulse. The detection failure can be an essential factor in the blurring out of the details of a video signal. The degree of detection of an outer value is determined by a parameter k.

Accordingly, noise reducers 200, 220 and 240 having independent but identical configurations are employed to reduce impulse noises of the $Y_{in}$, $U_{in}$, and $V_{in}$ signals.

However, since a typical digital standard image has a 4:2:0 format or a 4:2:2 format, a single noise reducer can be employed instead of the second and third noise reducers 220 and 240 for $U_{in}$ and $V_{in}$ signals. In order to employ a single noise reduction block, a multiplexer for selecting the $U_{in}$ or $V_{in}$ signals can be installed in front of the noise reduction block, and a demultiplexer for separating the noise-reduced $U_{in}$ or $V_{in}$ signal can be provided in rear of the noise reduction block.

A main function of the image quality enhancing circuit is to enhance image contrast using a contrast enhancer 300 based on mean-separate histogram equalization having gain control and brightness compensation (referred to hereinafter as a contrast enhancer).

According to the basic concept of the mean-separate histogram equalization proposed by the present invention, a given image is divided into two individual groups on the basis of the mean value of the given image, and the divided sub-images are independently equalized.

If the proposed mean-separate histogram equalization is applied, an abrupt change in brightness and artifacts, which can be generated after a general histogram equalization when an input image has a concentrated distributed histogram, can be effectively prevented. Also, the functions of gain control and brightness compensation can combine with the mean-separate histogram equalization. However, other embodiments of histogram equalization as well as the proposed mean-separate histogram equalization can be applied in the present invention.

The brightness compensation can be simply carried out by mapping a current mean to a desired output mean during the mean-separate histogram equalization. Also, the gain control functions to prevent excessive contrast enhancement by controlling the gain of a signal enhanced by the mean-separate histogram equalization depending on, or on the basis of, the level of an input signal.

A local contrast enhancer 400 for sharpness enhancement detects a local contrast and adaptively weights the input sample by applying a weight value to the local contrast according to the amplitude of the detected local contrast. As used here, a local contrast is defined as a difference between an input sample value and respective low-pass filtered sample values within a predetermined window size which includes the input sample. The weight value applied depends on a weighting function.

A color compensator 500 appropriately compensates for color signals U and V output by the second and third noise reducers 220 and 240, according to a luminance signal Y output by the first noise reducer 200 and a changed luminance signal Y' output by the local contrast enhancer 400. The color compensator 500 maps a current color signal put on a given luminance plane to a color signal obtained by moving in a color direction until the color signal intersects an enhanced luminance plane in an RGB space. Consequently, compensated color signals U' and V' are output by changing the color signals U and V by the same ratio as that of the change of the luminance signal.

A second color converter 600 receives the signal Y' output by the local contrast enhancer 400 and the U' and V' signals output by the color compensator 500 and outputs $R_{out}$, $G_{out}$ and $B_{out}$ signals through an inverse processing of the conversion performed by the first color converter 100.

The external parameters shown in FIG. 1 are useful and characterize the entire function of the image quality enhancing circuit, which are a parameter (k) for noise reduction degree, a parameter (S) for selection of a recursive/nonrecursive noise reduction mode, gain control parameters ($\gamma_u$, $\gamma_L$) which are input to the contrast enhancer 300, a sharpness control parameter ($\beta$) which is input to the local contrast enhancer 400 and a color control parameter ($\alpha$) which is input to the color compensator 500.

Figure 2:
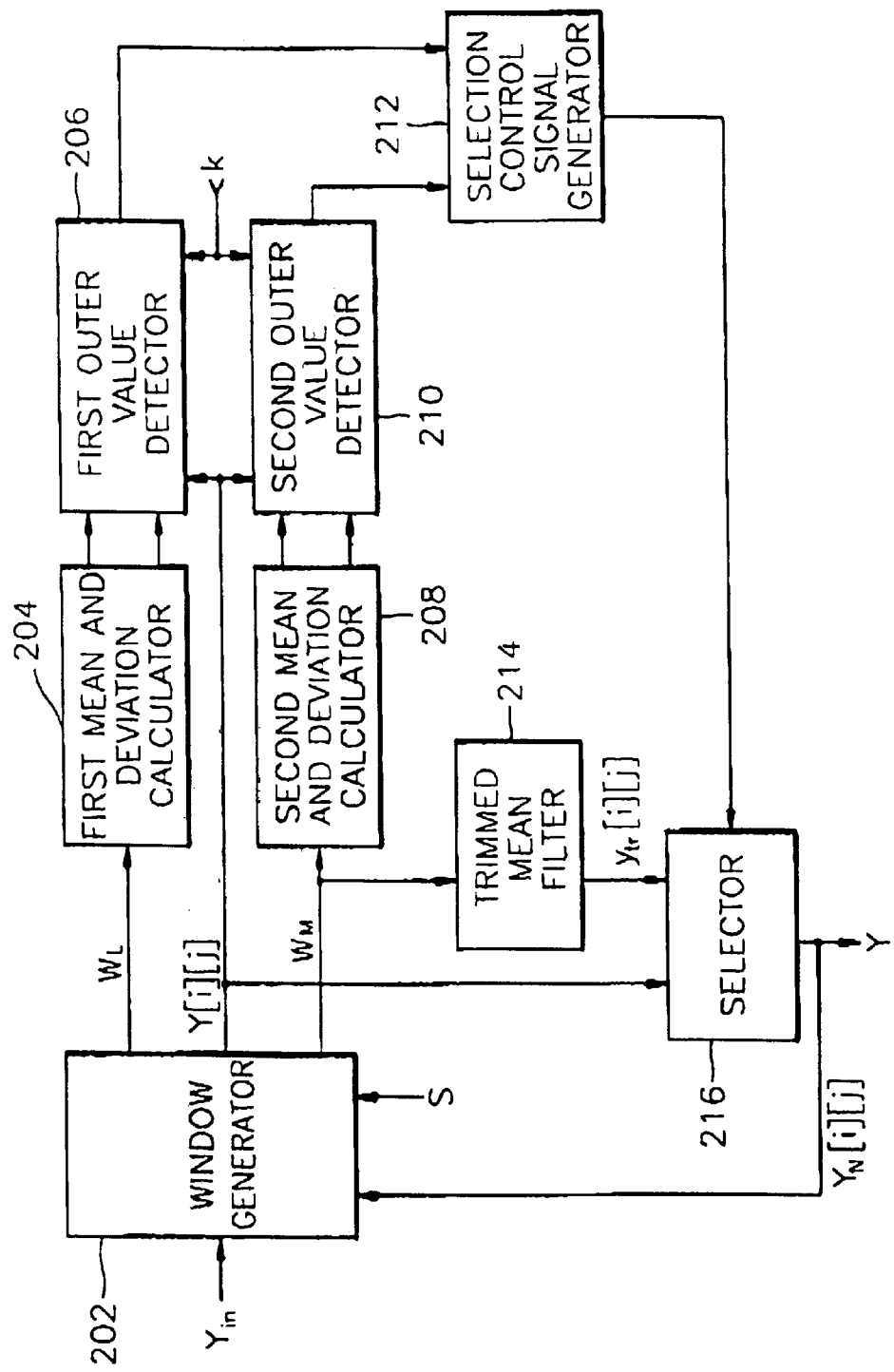
FIG. 2 is a detailed block diagram of the first noise reducer shown in FIG. 1.

FIG. 2 is a detailed block diagram of the first noise reducer 200 shown in FIG. 1. Here, although the second and third noise reducers 220 and 240 have the same configurations, only the first noise reducer 200 for removing impulse noise of a $Y_{in}$ signal will be described.

Referring to FIG. 2, a window generator 202 outputs two windows expressed by the following equations, and a current input sample Y[i][j].

$$W_L = \begin{bmatrix} W_{-L1}^{-L2} & \cdots & W_{-L1}^{0} & \cdots & W_{-L1}^{L2} \\ W_{0}^{-L2} & \cdots & W_{0}^{0} & \cdots & W_{0}^{L2} \\ W_{L1}^{-L2} & \cdots & W_{L1}^{0} & \cdots & W_{L1}^{L2} \end{bmatrix} \quad (2)$$

$$W_M = \begin{bmatrix} W_{-M1}^{-M2} & \cdots & W_{-M1}^{0} & \cdots & W_{-M1}^{M2} \\ W_{0}^{-M2} & \cdots & W_{0}^{0} & \cdots & W_{0}^{M2} \\ W_{M1}^{-M2} & \cdots & W_{M1}^{0} & \cdots & W_{M1}^{M2} \end{bmatrix} \quad (3)$$

wherein, $W_L$ and $W_M$ are referred to as large and small windows, respectively. That is, L1 is greater than M1. The composition samples of the large and small windows output by the window generator 202 vary with a recursive/nonrecursive noise reduction mode signal (S). For this explanation, an example of $L_1=L_2=2$ and $M_1=M_2=1$ will be taken.

That is, in the case of a nonrecursive noise reduction mode, a 5×5 large window ($W_L$) and a 3×3 small window ($W_M$) generated by the window generator 202 are as follows.

$$W_L = \begin{bmatrix} Y[i-2][j-2], & Y[i-2][j-1], & Y[i-2][j], & Y[i-2][j+1], & Y[i-2][j+2] \\ Y[i-2][j-2], & Y[i-1][j-1], & Y[i-1][j], & Y[i-1][j+1], & Y[i-1][j+2] \\ Y[i][j-2], & Y[i][j-1], & Y[i][j], & Y[i][j+1], & Y[i][j+2] \\ Y[i+1][j-2], & Y[i+1][j-1], & Y[i+1][j], & Y[i+1][j+1], & Y[i+1][j+2] \\ Y[i+2][j-2], & Y[i+2][j-1], & Y[i+2][j], & Y[i+2][j+1], & Y[i+2][j+2] \end{bmatrix} \quad (4)$$

$$W_M = \begin{bmatrix} Y[i-1][j-1], & Y[i-1][j], & Y[i-1][j+1] \\ Y[i][j-1], & Y[i][j], & Y[i][j+1] \\ Y[i+1][j-1], & Y[i+1][j], & Y[i+1][j+1] \end{bmatrix} \quad (5)$$

In the case of a recursive noise reduction mode, a 5×5 large window ($W_L$) and a 3×3 small window ($W_M$) generated by the window generator 202 are as follows.

$$W_L = \begin{bmatrix} Y_N[i-2][j-2], & Y_N[i-2][j-1], & Y_N[i-2][j], & Y_N[i-2][j+1], & Y_N[i-2][j+2] \\ Y_N[i-2][j-2], & Y_N[i-1][j-1], & Y_N[i-1][j], & Y_N[i-1][j+1], & Y_N[i-1][j+2] \\ Y_N[i][j-2], & Y_N[i][j-1], & Y[i][j], & Y[i][j+1], & Y[i][j+2] \\ Y[i+1][j-2], & Y[i+1][j-1], & Y[i+1][j], & Y[i+1][j+1], & Y[i+1][j+2] \\ Y[i+2][j-2], & Y[i+2][j-1], & Y[i+2][j], & Y[i+2][j+1], & Y[i+2][j+2] \end{bmatrix} \quad (6)$$

$$W_M = \begin{bmatrix} Y_N[i-1][j-1], & Y_N[i-1][j], & Y_N[i-1][j+1] \\ Y_N[i][j-1], & Y[i][j], & Y[i][j+1] \\ Y[i+1][j-1], & Y[i+1][j], & Y[i+1][j+1] \end{bmatrix} \quad (7)$$

Here, $Y_N[][]$ denotes a signal output by the noise reducer 200 shown in FIG. 2 according to the present invention, i.e., a filtered signal.

Figure 3:
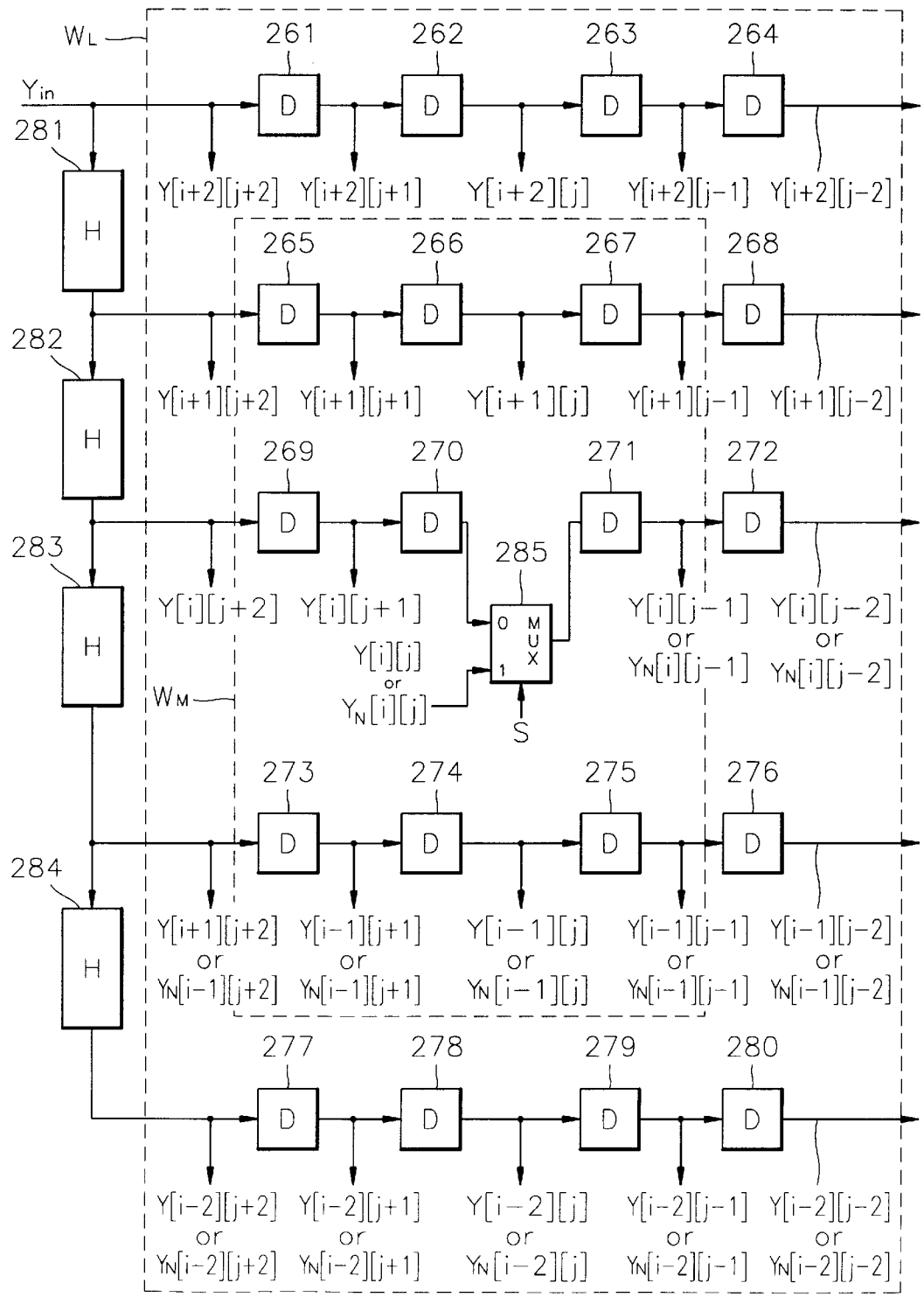
FIG. 3 is a detailed circuit diagram of the window generator shown in FIG. 2.

As shown in FIG. 3, the detailed circuit diagram of the window generator 202 is comprised of a plurality of sample delays 261 to 280, four line delays 281 to 284 and a multiplexer 285. Here, the multiplexer 285 selects an input sample Y[i][j] upon the nonrecursive noise reduction mode and selects a final output signal $Y_N[i][j]$ output by a selector 216 upon the recursive noise reduction mode, according to the external recursive/nonrecursive noise reduction mode signal (S). Also, D and H denote a sample delay and a line memory, respectively.

A first mean and deviation calculator 204 receives samples of the large window ($W_L$) generated by the window generator 202, obtains a mean sample value ($A_L$) of the large window ($W_L$) using the following equation 8, and calculates the mean ($D_L$) of the absolute deviations of the samples of the large window ($W_L$) using the following equation 9.

$$A_L = \frac{1}{(2L_1+1)(2L_2+1)} \sum_{l=-L_1}^{L_1} \sum_{m=-L_2}^{L_2} W_l^m \qquad (8)$$

$$D_L = \frac{1}{(2L_1+1)(2L_2+1)} \sum_{l=-L_1}^{L_1} \sum_{m=-L_2}^{L_2} |W_l^m - A_L| \qquad (9)$$

A first outer value detector 206 outputs a first outer value detecting signal by determining that an impulse component is included in the input sample Y[i][j], when an absolute difference between the input sample Y[i][j] and the mean sample value ($A_L$) of the large window ($W_L$) is greater than the mean ($kD_L$) of an absolute deviation multiplied by a predetermined parameter (k), i.e., $|Y[i][j]-A_L| > kD_L$. Here, k denotes a noise reduction parameter.

A second mean and deviation calculator 208 receives samples of the small window ($W_M$) generated by the window generator 202, obtains a mean sample value ($A_M$) of the small window ($W_M$) using the following equation 10, and calculates the mean ($D_M$) of the absolute deviations of the samples of the small window ($W_M$) using the following equation 11.

$$A_M = \frac{1}{(2M_1+1)(2M_2+1)} \sum_{l=-M_1}^{M_1} \sum_{m=-M_2}^{M_2} W_l^m \qquad (10)$$

$$D_M = \frac{1}{(2M_1+1)(2M_2+1)} \sum_{l=-M_1}^{M_1} \sum_{m=-M_2}^{M_2} |W_l^m - A_M| \qquad (11)$$

A second outer value detector 210 outputs a second outer value detecting signal by determining that an impulse component is included in the input sample Y[i][j], when an absolute difference between the input sample Y[i][j] and the mean sample value ($A_M$) of the small window ($W_M$) is greater than the mean ($kD_M$) of an absolute deviation multiplied by the parameter (k), i.e., $|Y[i][j]-A_M| > kD_M$.

A selection control signal generator 212 generates a selection control signal for selecting the output of a trimmed mean filter 214 when the first and second outer value detecting signals generated by the first and second outer value detectors 206 and 210 are all generated, and, otherwise, bypassing the input sample without change.

Meanwhile, the trimmed mean filter 214 trims the sample of the small window $W_M$ generated by the window generator 202 using following equation 12, and outputs an output signal $Y_{tr}[i][j]$ by taking the mean of residual samples.

$$y_{tr}[i][j] = \frac{1}{|T_M|} \sum_{l=-M_1}^{M_1} \sum_{m=-M_2}^{M_2} W_l^m T_l^m$$

wherein, $$T_l^m = \begin{cases} 1, & \text{if } |W_l^m - A_M| \le kD_M \\ 0, & \text{elsewhere} \end{cases}$$

and $$|T_M| = \sum_{l=-M_1}^{M_1} \sum_{m=-M_2}^{M_2} T_l^m \qquad (12)$$

$|T_M|$ denotes the number of untrimmed samples or the number of samples which are not determined as outer values. An embodiment of the present invention uses the small window as a trimming window, but the size of the trimming window is variable.

The selector 216 selects the output signal $Y_{tr}[i][j]$ of the trimmed mean filter 214 according to the selection control signal generated by the selection control signal generator 212, i.e., only when the outer values are detected in both of the first and second outer value detectors 206 and 210. Otherwise, the selector 216 outputs an output signal ($Y=Y_N$[i][j]) by bypassing the input sample Y[i][j] output by the window generator 202 without change. The output signal ($Y=Y_N$[i][j]) is fed back to the window generator 202, and simultaneously output to the contrast enhancer 300 and the color compensator 500.

Figure 4:
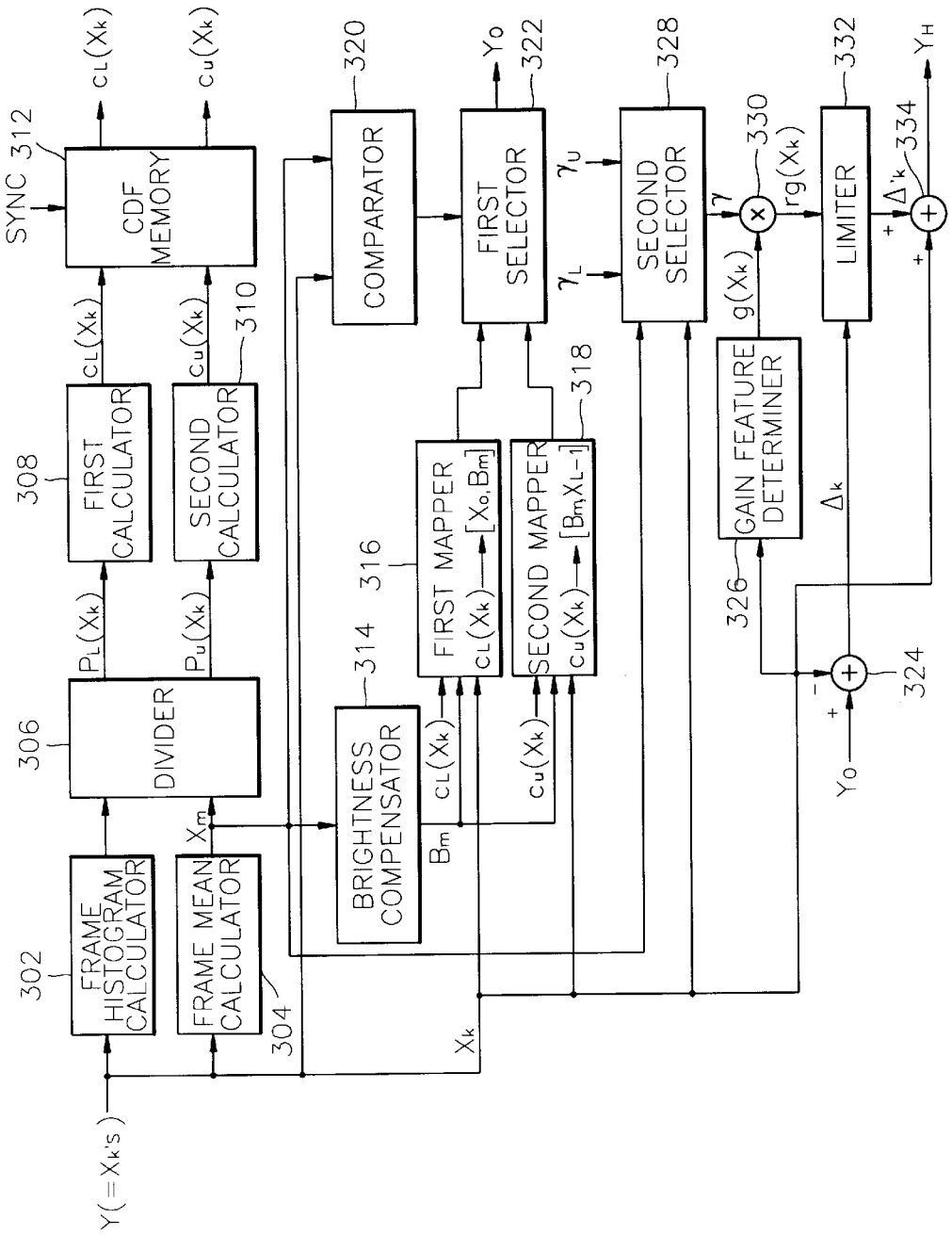
FIG. 4 is a detailed block diagram of the contrast enhancer based on mean-separation histogram equalization having gain control and brightness compensation, shown in FIG. 1.

FIG. 4 is a detailed block diagram of the contrast enhancer 300 shown in FIG. 1. Referring to FIG. 4, a frame histogram calculator 302 receives a luminance signal (Y) output by the first noise reducer 200 shown in FIG. 1 and calculates a histogram in units of one picture. That is, the distribution of the gray level of a frame image is calculated. The picture unit can be a field, but here is set to be a frame. At this time, an input image signal {Y} is comprised of L discrete levels represented by $\{X_0, X_1, \ldots, X_{L-1}\}$.

A frame mean calculator 304 calculates the mean level ($X_m$) of the luminance signal output by the first noise reducer 200 in units of frame. At this time, $X_m \in \{X_0, X_1, \ldots, X_{L-1}\}$. A divider 306 divides the gray level distribution calculated by the frame histogram calculator 302 into the predetermined number (here, two) of subimages $\{X\}_L$ and $\{X\}_U$ on the basis of the mean level ($X_m$) calculated by the frame mean calculator 304, and outputs probability density functions $P_L(X_k)$ and $P_U(X_k)$ of two subimages. The probability density functions $P_L(X_k)$ and $P_U(X_k)$ can be calculated by following equations 13 and 14.

$$p_L(X_k) = \frac{n_k^L}{n_L}, \text{ for } k = 0, 1, \ldots, m \qquad (13)$$

$$p_U(X_k) = \frac{n_k^u}{n_u}, \text{ for } k = m+1, m+2, \ldots, L-1 \qquad (14)$$

wherein L is the number of levels, $P_L(X_k)$ is a probability of a k-th gray level ($X_k$) in the subimage $\{X\}_L$, $P_U(X_k)$ is a probability of a k-th gray level ($X_k$) in the subimage $\{X\}_U$, $n_k^L$ and $n_k^U$ denote the numbers of times in which the level $X_k$ appears in each subimage, and $n_L$ and $n_U$ are the numbers of the respective entire samples in the subimages $\{X\}_L$ and $\{X\}_U$.

A first CDF calculator 308 receives the probability density functions $P_L(X_k)$ of a subimage (hereinafter, called as a first subimage) having samples all being lower than or equal to the mean level ($X_m$) from the divider 306 and calculates a cumulative density function (CDF) $c_L(X_k)$ using following equation 15.

$$c_L(X_k) = \sum_{j=0}^{k} p_L(X_j) \quad (15)$$

A second CDF calculator 310 receives the probability density functions $P_U(X_k)$ of a subimage (hereinafter, called as a second subimage) having samples all being greater than the mean level $(X_m)$ from the divider 306 and calculates a cumulative density function $c_U(X_k)$ using following equation 16.

$$C_U(X_k) = \sum_{j=m+1}^{k} p_U(X_j) \quad (16)$$

A CDF memory 312 renews the cumulative density functions $c_L(X_k)$ and $c_U(X_k)$ calculated by the first and second CDF calculators 308 and 310 in frame units according to a synchronous signal (SYNC), and provides the previously stored prior-to-one-frame cumulative density functions $c_L(X_k)$ and $c_U(X_k)$ to first and second mappers 316 and 318 during renewal, respectively. Here, the synchronous signal is a field synchronous signal when the picture unit is a field, and is a frame synchronous signal when it is a frame. The CDF memory 312 is used as a buffer.

Meanwhile, a brightness compensator 314 receives the mean level $(X_m)$ output by the frame mean calculator 304, adds a corrected value $(\Delta)$ depending on the mean brightness of a signal input to the contrast enhancer 300 to the mean level $(X_m)$ as shown in following equation 17, and outputs a compensated mean level $(B_m)$ $$B_m = X_m + \Delta \quad (17)$$

That is, when $B_m$ is a compensated mean level and $\Delta$ is a corrected value obtained by a predetermined correction function depending on a mean brightness, the compensated mean level $(B_m)$ becomes a result obtained by adding the corrected value $(\Delta)$ to the mean level $(X_m)$ At this time, $B_m \subset \{X_0, X_1, \ldots, X_{L-1}\}$.

Figure 5A:
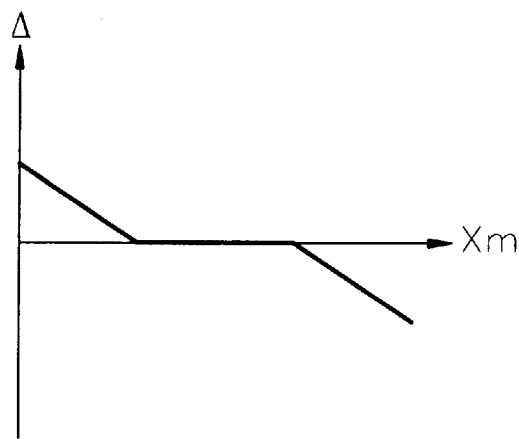
FIGS. 5a and 5b show examples of brightness correcting functions which are applied to the brightness compensator shown in FIG. 4.
Figure 5B:
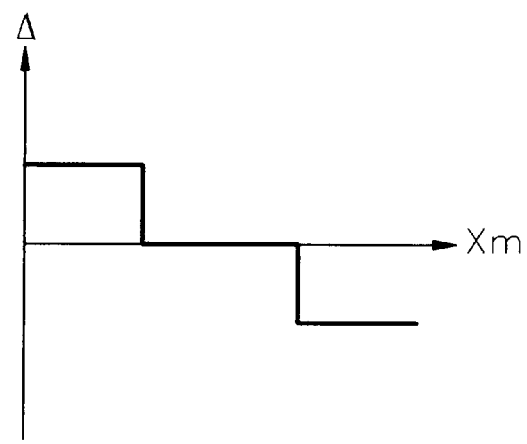

The corrected value $(\Delta)$ is determined by correction functions shown in FIGS. 5a and 5b. The present invention is not limited to such examples as the correction functions shown in FIGS. 5a and 5b, and other application examples can exist.

The brightness of enhanced signal $(Y_o)$ is controlled by the corrected value depending on the correction functions shown in FIGS. 5a and 5b. That is, when the mean level $(X_m)$ is very small, i.e., when an image is very dark, a corrected value $(\Delta)$ being larger than 0 is added to the mean level $(X_m)$, and the mean-separate histogram equalization proposed by the present invention is then performed, whereby the mean brightness of the enhanced signal $(Y_o)$ becomes high.

Also, when the mean level $(X_m)$ is very large, i.e., when an image is very bright, a corrected value $(\Delta)$ being smaller than 0 is added to the mean level $(X_m)$, and the mean-separate histogram equalization proposed by the present invention is then performed, whereby the mean brightness of the enhanced signal $(Y_o)$ becomes low. Accordingly, when the mean-separate histogram equalization is performed using the mean level $(B_m)$ compensated by a predetermined appropriate corrected value $(\Delta)$ according to the mean level $(X_m)$, the image quality of an input image can be remarkably enhanced.

Figure 6A:
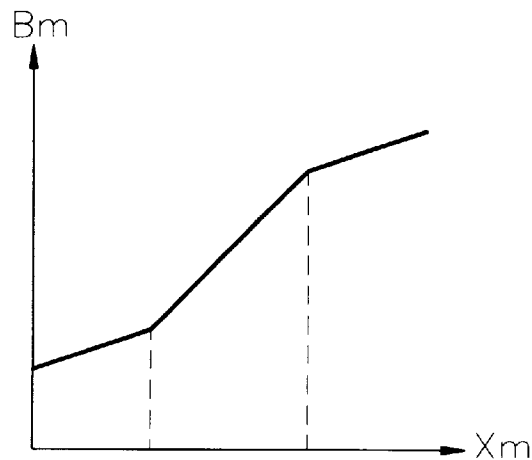
FIGS. 6a and 6b show the relationships between average levels compensated by the brightness correcting functions shown in FIGS. 5a and 5b and those of input images, respectively.
Figure 6B:
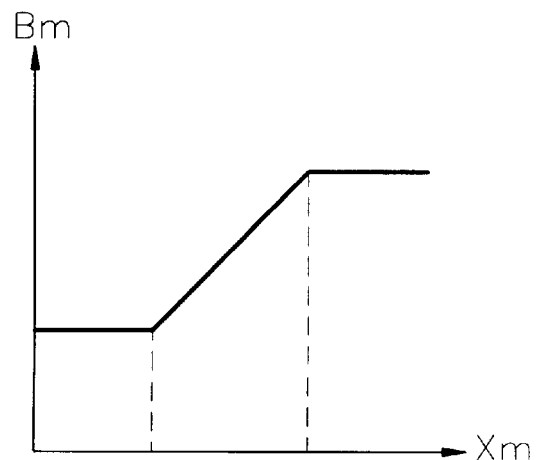

FIGS. 6a and 6b show the relationship between the mean level $(X_m)$ and the compensated mean level $(B_m)$ to which a corrected value $(\Delta)$ depending on the brightness correction function shown in FIGS. 5a and 5b is added.

Meanwhile, the first mapper 316 shown in FIG. 4 receives the cumulative density function $c_L(X_k)$ calculated by the first CDF calculator 308, the signal $(X_k)$ output from the first noise reducer 200, and the compensated mean level $(B_m)$ output by the brightness compensator 314, and maps the samples $\{X\}_L$ of the first subimage to a gray level ranging from 0 to $B_m$ according to the cumulative density function.

The second mapper 318 receives the cumulative density function $c_U(X_k)$ calculated by the second CDF calculator 310, the signal $(X_k)$ output by the first noise reducer 200, and the compensated mean level $(B_m)$ output by the brightness compensator 314, and maps the samples $\{X\}_U$ of the second subimage to a gray level ranging from $B_m'$ to $X_{L-1}$ according to the cumulative density function.

The outputs mapped by the first and second mappers 316 and 318 are expressed by following equation 18, and $B_m'$ is expressed by following equation 19.

$$Y_o = \begin{cases} c_L(X_k)B_m & \text{if } X_k \leq X_m \\ B_m' + (X_{L-1} - B_m')c_U(X_k) & \text{if } X_k > X_m \end{cases} \quad (18)$$

wherein $B_m'$ denotes a first gray level which is mapped in a higher region than the compensated mean level $(B_m)$.

$$B_m' = B_m + X_{L-1}/(L-1) \quad (19)$$

Accordingly, the equation 18 shows the results of mapping input samples to $(0, B_m)$ when they are equal to or smaller than the mean level $(X_m)$ and mapping the input samples to $(B_m', X_{L-1})$ when they are larger than the mean level $(X_m)$.

Also, when a corrected value is larger than 0 (i.e., $\Delta > 0$), the equalized output $(Y_o)$ becomes bright, and when it is smaller than 0 (i.e., $\Delta < 0$), the equalized output $(Y_o)$ becomes dark. As the A increases, a dynamic range at a lower region will be enhanced, and as the A decreases, a dynamic range at an upper region will be enhanced. A predetermined appropriate compensated mean level $(B_m)$ depending on the mean level $(X_m)$ greatly enhances the image quality of an input image.

A comparator 320 compares the signal $(X_k)$ output by the first noise reducer 200 with the mean level $(X_k)$ output by the frame mean calculator 304 and generates a selection control signal. A first selector 322 selects the first mapper 316 when the signal $(X_k)$ output by the first noise reducer 200 is lower than the mean level $(X_m)$, and otherwise, selects the second mapper 318.

Here, the signal $(X_k)$ input to the first and second mappers 316 and 318 is a signal of the frame next to a frame corresponding to the cumulative density function value output by the CDF memory 312. Thus, a frame memory for delaying a signal output by the first noise reducer 200 by one frame can be additionally provided to input a signal of the same frame as that of the cumulative density function output by the CDF memory 312 to the first and second mappers 316 and 318. However, the frame memory can be omitted using the characteristic that there is a high correlation between adjacent frames, so that hardware is reduced.

Furthermore, without separately using the frame histogram calculator 302 and the CDF calculators 308 and 310, the gray level distribution of an image signal of each subgroup by the CDF calculators 308 and 310 without the frame histogram calculator 302 is calculated, and a CDF can be calculated on the basis of the result.

Meanwhile, a subtracter 324 and an adder 334 perform a function of controlling the gain of the enhanced signal ($Y_o$). Here, a basic concept of the gain control is that a variation of the maximum gray level of an input signal (Y) is restricted according to the degree of contrast enhancement when a contrast is enhanced using the mean-separate histogram equalization.

First, the relationship between the input signal ($Y=X_k$) and the enhanced signal ($Y_o$) will be expressed by following equation 20 or 21;

$$Y_o = X_k + \Delta_k \quad (20)$$

or $$Y_o - X_k = \Delta_k \quad (21)$$

wherein $\Delta_k$ is the amount of variation (the degree of enhancement) made by the mean-separate histogram equalization when an input sample is $X_k$, i.e., a difference between the level of the input signal ($Y=X_k$) and the level ($Y_o$) mapped to a new gray level by the mean-separate histogram equalization.

In order to prevent excess enhancement due to histogram equalization, the amount of variation $\Delta_k$ according to the present invention is restricted as follows.

$$|\Delta_k| \leq \gamma \cdot g(X_k) \quad (22)$$

wherein $g(X_k)$ denotes a maximum bounding function, the $g(X_k)$ is a function of the input signal ($Y=X_k$) and always has a positive value (i.e., $g(X_k) \geq 0$), and $\gamma (\gamma \geq 0)$ is a gain control parameter. The above equation 22 can be expressed by following equation 23 as the same equation.

$$-r \cdot g(X_k) \leq \Delta_i \leq r \cdot g(X_k) \quad (23)$$

The concept of restricting the amount of variation $\Delta_k$ expressed as the equation 22 is related to the Weber's ratio. In fact, if $g(X_k)$ is equal to $X_k$, the following equation 24 can be obtained from the above equation 22.

$$\frac{|\Delta_k|}{X_k} \leq \gamma \quad (24)$$

wherein $$\frac{|\Delta_k|}{X_k}$$

is the amount corresponding to the Weber's ratio. The Weber's ratio is an experimental fact that human beings feel that, when $X_1$ is changed by $\gamma X_1$ and $X_2$ is changed by $\gamma X_2$, the degrees of the variations are the same. Thus, the concept of the gain control applied to the present invention is to control the gain, i.e., the enhancement degree of an enhanced signal using the mean-separate histogram having a brightness compensating function on the basis of the Weber's ratio.

The subtracter 324 shown in FIG. 4 subtracts the input signal ($Y=X_k$) output by the first noise reducer 200 from the enhanced signal ($Y_o$) output by the first selector 322 and obtains the amount of variation ($\Delta_k$) made by the mean-separate histogram equalization having the brightness compensation function.

A gain feature determiner 326 restricts enhancement of the input signal ($X_k$) by outputting a maximum bounding function $g(X_k)$ being a function of the input signal ($X_k$). For instance, when the $g(X_k)$ is K1 and the K1 is a constant, the $g(X_k)$ restricts input enhancement by identical amount regardless of an input gray level value. The maximum bounding function $g(X_k)$ can be equal to $aX_k$ or $a\sqrt{X_k}$ (here, a is a constant), and differently restricts the enhanced amount of an input image according to the input gray level value.

A second selector 328 compares the input signal ($X_k$) with the mean level ($X_m$) output by the frame mean calculator 304, and selects a first gain control parameter ($\gamma_L$) when the input signal ($X_k$) is lower than or equal to the mean level ($X_m$) and otherwise, selects a second gain control parameter ($\gamma_U$). Here, the first gain control parameter ($\gamma_L$) is a parameter for a first subimage signal, and the second gain control parameter ($\gamma_U$) is a parameter for a second subimage signal. Here, the first and second gain control parameters ($\gamma_L$) and ($\gamma_U$) can be given as the same value to the input signal in contrast that different gain control parameters are provided to each subimage.

A multiplier 330 multiplies the value of the maximum bounding function $g(X_k)$ output by the gain feature determiner 326 by a gain control parameter ($\gamma$) selected by the second selector 328 and outputs a limit value ($\gamma \cdot g(X_k)$). Here, the limit value $\gamma \cdot g(X_k)$ is a characteristic of the gain control according to the present invention.

A limiter 332 compares the variation amount ($\Delta_k$) output by the subtracter 324 with the limit value $\gamma \cdot g(X_k)$ output by the multiplier 330, restricts the variation amount ($\Delta_k$) and outputs a restricted variation amount ($\Delta_k'$) like the following equation 25.

$$\Delta_k' = \begin{cases} \Delta_k, & \text{if } |\Delta_k| \leq \gamma \cdot g(X_k) \\ \gamma \cdot g(X_k), & \text{if } \Delta_k > \gamma \cdot g(X_k) \\ -\gamma \cdot g(X_k), & \text{if } \Delta_k < -\gamma \cdot g(X_k) \end{cases} \quad (25)$$

That is, when an absolute value of the variation amount ($\Delta_k$) is equal to or smaller than $\gamma \cdot g(X_k)$, the variation amount ($\Delta_k$) is used as the restricted variation amount ($\Delta_k'$). When the variation amount ($\Delta_k$) is greater than $\gamma \cdot g(X_k)$, the variation amount ($\Delta_k$) is restricted to the $\gamma \cdot g(X_k)$. When the variation amount ($\Delta_k$) is smaller than $-\gamma \cdot g(X_k)$, the variation amount ($\Delta_k$) is restricted to the $-\gamma \cdot g(X_k)$, thereby controlling the gain of the enhanced signal ($Y_o$).

The adder 334 adds the input signal ($X_k$) to the restricted variation amount ($\Delta_k'$) output by the limiter 332 and outputs an output signal ($Y_H$) as shown in the following equation 26. Thus, the final output signal ($Y_H$) of the contrast enhancer 300 can be expressed as follows.

$$Y_H = X_k + \Delta_k' \quad (26)$$

Figure 7:
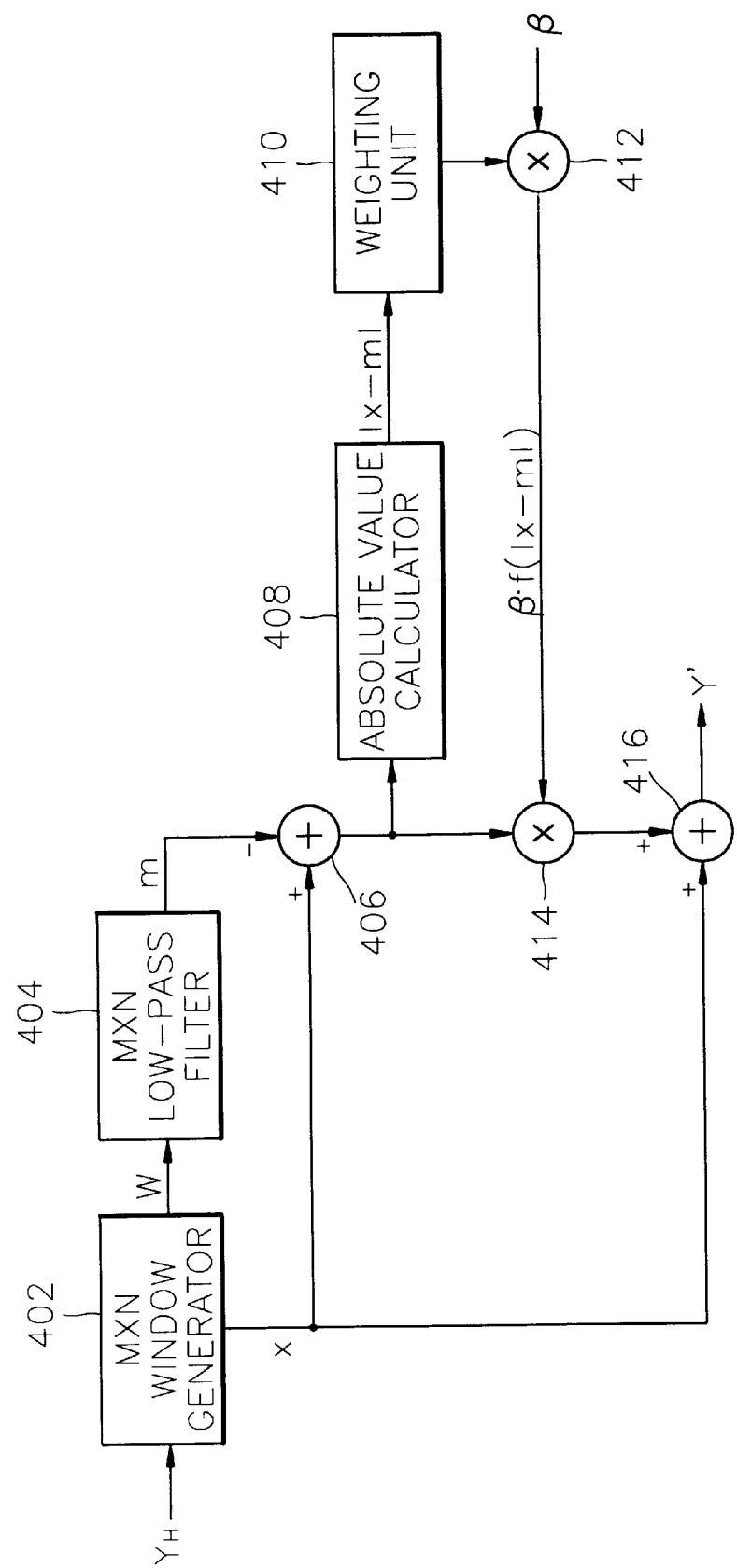
FIG. 7 is a detailed block diagram of the local contrast enhancer shown in FIG. 1.

FIG. 7 is a detailed block diagram of the local contrast enhancer 400 shown in FIG. 1, wherein an M×N window generator 402 receiving the output ($Y_H$) of the contrast enhancer 300 shown in FIG. 1 generates an M×N window (W) which can be expressed by the following equation 27, and outputs it to an M×N low-pass filter (LPF) 404.

$$W = \begin{bmatrix} W_{11}, W_{12}, \ldots, W_{1N} \\ W_{21}, W_{22}, \ldots, W_{2N} \\ W_{M1}, W_{M2}, \ldots, W_{MN} \end{bmatrix} \quad (27)$$

Also, a middle sample (x) of a center line of the M×N window (W) is input to a subtracter 406 and an adder 416. Here, the middle sample (x) of the center line is an input sample for improving a contrast.

Figure 8:
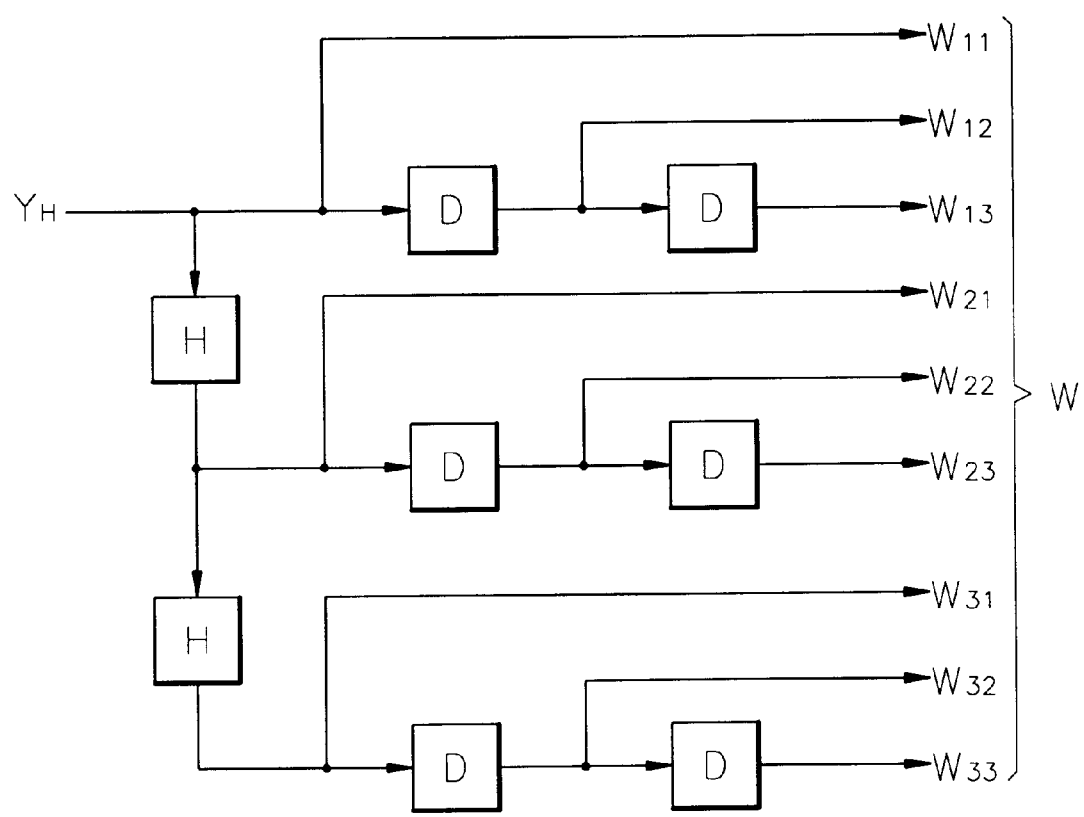
FIG. 8 is a detailed circuit diagram of the M×N window generator shown in FIG. 7.

FIG. 8 is a detailed circuit diagram of the M×N window generator 402 when both M and N are equal to 3. Referring to FIG. 8, D and H denote a sample delay and a line memory, respectively. The output signal (m) of the M×N LPF 404 shown in FIG. 7 can be represented by the following equation 28.

$$m = \sum_{i=1}^{M} \sum_{j=1}^{N} b_{ij} W_{ij} \quad (28)$$

$$\begin{bmatrix} b_{11}, \cdots, b_{1N} \\ \cdots \\ b_{M1}, \cdots, b_{MN} \end{bmatrix}$$

wherein $b_{ij}$ is a predetermined coefficient, and corresponds to an impulse response of the M×N LPF 404.

A subtracter 406 subtracts the output signal (m) of the M×N LPF 404 from the middle sample value (x). An absolute value calculator 408 calculates an absolute value of the output of the subtracter 406, and a weighting unit 410 outputs a value obtained by weighting the output of the absolute value calculator 408 using a predetermined weighting function f(|x−m|). A first multiplier 412 multiplies a predetermined parameter (β) by the output of the weighting unit 410.

A second multiplier 414 multiplies the output of the subtracter 406 by the output of the first multiplier 412 and outputs the multiplied result β·f(|x−m|)(x−m). An adder 416 adds the multiplied result to the middle sample (x) of the M×N window generator 402.

At this time, a difference between the middle sample (x) of the M×N window generator 402 and the output signal (m) of the M×N LPF 404 can be defined as a contrast visually felt by a human being, i.e., a local contrast. In other words, a place where the value |x−m| is large can be called a region having a high contrast, and a place where the value |x−m| is small can be called a region having a low contrast. The local contrast is enhanced by amplifying the value |x−m| by f(|x−m|) according to the above-defined local contrast and adding the result to the original signal (x). The output (Y') of the adder 416 will be expressed by following equation 29.

$$Y' = x + \beta \cdot f(|x-m|)(x-m) \quad (29)$$

wherein the function f( ) being a weighting function is a function of f|x−m|. Various types of enhancement characteristics for the local contrast can be realized by appropriately selecting a weighting function. Also, β is a parameter for adjusting the amount of enhancement of an entire local contrast.

For example, when f(|x−m|) equals 0, Y' equals x, i.e., there is no contrast enhancement effect. Thus, given that when |x−m| is smaller than T, f(|x−m|) is K2, and that when |x−m| is greater than T, f(|x−m|) is 0, (here, T and K2 are constants), the local contrast is amplified by K2 times in a region where the local contrast is small (i.e., |x−m|<T). On the other hand, in a region where it is already determined that the local contrast is large, adaptive local contrast enhancement of bypassing an input sample is performed.

Figure 9:
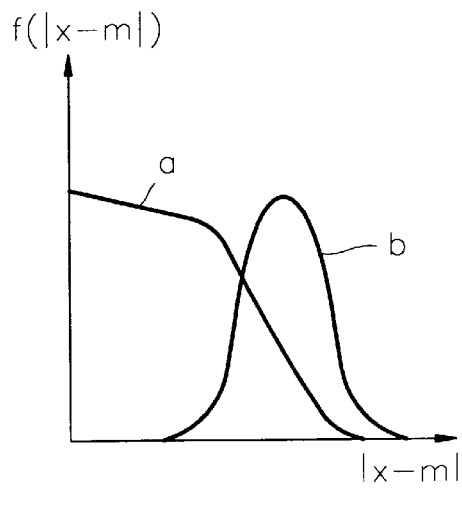
FIG. 9 shows the characteristic of a weighting function applied to a weighting unit shown in FIG. 7.

FIG. 9 show examples of a weighting function for determining a weighted value of a local contrast according to |x−m|. Various contrast enhancement characteristics can be obtained by using the weighting functions indicated by (a) and (b).

Figure 10:
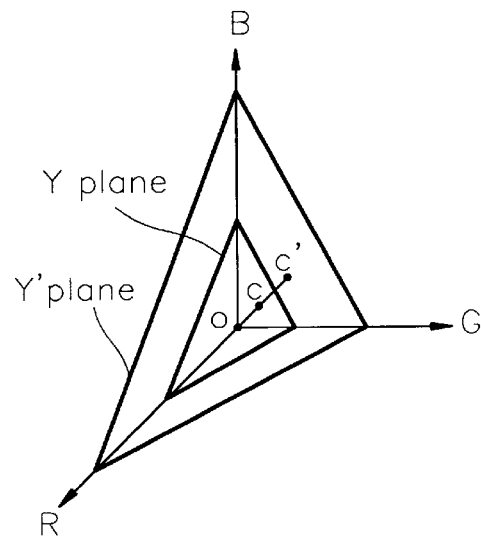
FIG. 10 is a view for illustrating color compensation according to a luminance variation.

Meanwhile, a color compensation method will be described with reference to FIGS. 10 and 11 before describing the color compensator 500 shown in FIG. 1.

A color signal C is given as R, G and B signals, the luminance signal Y shown in the equation 1 is given as a1R+a2G+a3B, and Y is converted into Y' through the contrast enhancer 300 and the local contrast enhancer 400. At this time, the object of the color compensation is to properly change the original color signal C=(R,G,B) according to the change of Y to Y'.

The basic concept of the color compensation according to the present invention is to change a given color to the color direction in a (R,G,B) space.

First, where Y equals a1R+a2G+a3B, R, G and B each having a constant value Y form a plane in the (R,G,B) space. That is, every color signal put on the plane where Y equals a1R+a2G+a3B has an identical luminance value. The change of luminance from Y to Y' involves the fact that the given color C is moved to a position on the Y' plane as shown in FIG. 10. At this time, in the present invention, suppose that the colors C and C' have the same color direction. Here, when C' equals (R',G',B'), it means that a straight line OC coincides with a straight line OC'. Thus, the compensated color C' on the Y' plane is obtained by detecting an intersecting point of the straight line OC and the Y' plane. Briefly, the original color signal C shown in FIG. 10 is mapped into the new color signal C' when the luminance value is changed from Y to Y', which is the intersecting point of the straight line OC and the Y' plane.

Now, (l,m,n) is defined as a directional cosine of the given color C in order to obtain the color C', which will be expressed by following equation 30;

$$l=R/r, \; m=G/r, \; n=B/r, \quad (30)$$

wherein r equals $$\sqrt{R^2 + G^2 + B^2} \; .$$

Similarly, the directional cosines l', m' and n' of the output color signals R', G' and B' can be expressed by following equation 31;

$$l'=R'/r', \; m'=G'/r', \; n'=B'/r', \quad (31)$$

wherein r' equals $\sqrt{R'^2+G'^2+B'^2}$. To make the two types of colors have the same color direction, the relationships shown in following equations 32 and 33 should be accomplished.

$$l=l', \; m=m', \; n=n' \quad (32)$$

$$R'/r'=R/r, \; G'/r'=G/r, \; B'/r'=B/r \quad (33)$$

Accordingly, the following equations 34, 35 and 36 are obtained.

$$R' = \frac{r'}{r} R \quad (34)$$

$$G' = \frac{r'}{r} G \quad (35)$$

$$B' = \frac{r'}{r} B \quad (36)$$

When the relationships given by equations 34, 35 and 36 are substituted for Y'=a1R'+a2G'+a3B', following equations 37, 38 and 39 are obtained;

$$Y' = a_1 \frac{r'}{r} R + a_2 \frac{r'}{r} G + a_3 \frac{r'}{r} B \qquad (37)$$

$$Y' = \frac{r'}{r}(a_1 R + a_2 G + a_3 B) \qquad (38)$$

$$Y' = \frac{r'}{r} = Y. \qquad (39)$$

Accordingly, such a result as the following equation 40 is obtained.

$$\frac{Y'}{Y} = \frac{r'}{r} \qquad (40)$$

Meanwhile, Equations 34 through 36 can be also expressed as following Equations 41 through 53 by using the result of the Equation 40.

$$R' = \frac{Y'}{Y} R \qquad (41)$$

$$G' = \frac{Y'}{Y} G \qquad (42)$$

$$B' = \frac{Y'}{Y} B \qquad (43)$$

Consequently, C' can be obtained as follows.

$$C'=(R',G',B') \qquad (44)$$

$$C'=(qR,qG,qB) \qquad (45)$$

wherein q equals Y'/Y which is a ratio between the original luminance signal and the resultant luminance signal. Since this means that the ratio of a luminance change is equal to that of a color change, the present invention performs color compensation by changing a color value according to the luminance change.

The color compensation can be easily performed on other color systems using the result of Equation 45. That is, for instance, the (Y,U,V) signals given in Equation 1, being the results of the color compensation given in Equation 45, should be converted into (qY,qU,qV) as shown in following Equations 46 to 51:

$$U'b_1R'+b_2G'+b_3B' \qquad (46)$$

$$U=q(b_1R+b_2G+b_3B) \qquad (47)$$

$$U=qU \qquad (48)$$

and, $$V'=c_1R'+c_2G'+c_3B' \qquad (49)$$

$$V=q(c_1R+c_2G+c_3B) \qquad (50)$$

$$V=qV \qquad (51).$$

Now, color compensation will be performed to prevent color saturation due to the above-described image quality enhancement method.

Figure 11:
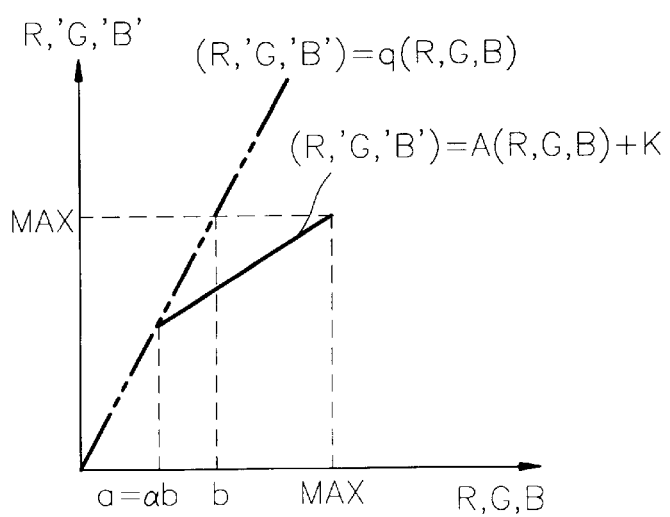
FIG. 11 shows a color compensation line for preventing color saturation.

The luminance ratio is given as q, and when the color compensation is made by a compensating line (R',G',B')=q(R,G,B) shown in FIG. 11, a color signal between a b(=Max/q) level and a maximum (Max) level is compensated to a maximum value (Max), which involves being saturated. That is because the colors between b and Max are consequently mapped to the Max and are not distinguished from each other, referring to the above-described compensating method.

In order to prevent the color saturation, the compensating line (R',G',B')=q(R,G,B) is approximated to a compensating line (R',G',B')=A(R,G,B)+K, for a color signal between a(=αb) level and a maximum level (Max). Here, a parameter (α) is greater than or equal to 0 and lower than or equal to 1, and A and K can be expressed by following Equations 52 and 53;

$$A = \frac{q(1-\alpha)}{(q-1)} \qquad (52)$$

and, $$K = \frac{(q-1)\alpha}{q-1} \text{Max}. \qquad (53)$$

Figure 12:
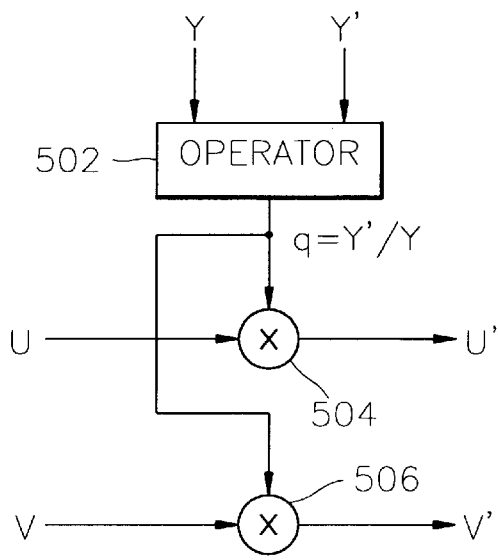
FIG. 12 is a detailed circuit diagram of the color compensator shown in FIG. 1 according to an embodiment of the present invention.

FIG. 12 is a detailed circuit diagram of the color compensator 500 shown in FIG. 1 according to an embodiment of the present invention, wherein an operator 502 operates a ratio (q) between a signal Y output by the first noise reducer 200 of FIG. 1 and a signal Y' output by the local contrast enhancer 400, i.e., the Y'/Y.

A first multiplier 504 multiplies a signal U output by the second noise reducer 220 of FIG. 1 by the ratio (q) output by the operator 502 and outputs a signal U'. A second multiplier 506 multiplies a signal V output by the third noise reducer 240 of FIG. 1 by the ratio (q) output by the operator 502 and outputs a signal V'.

Figure 13:
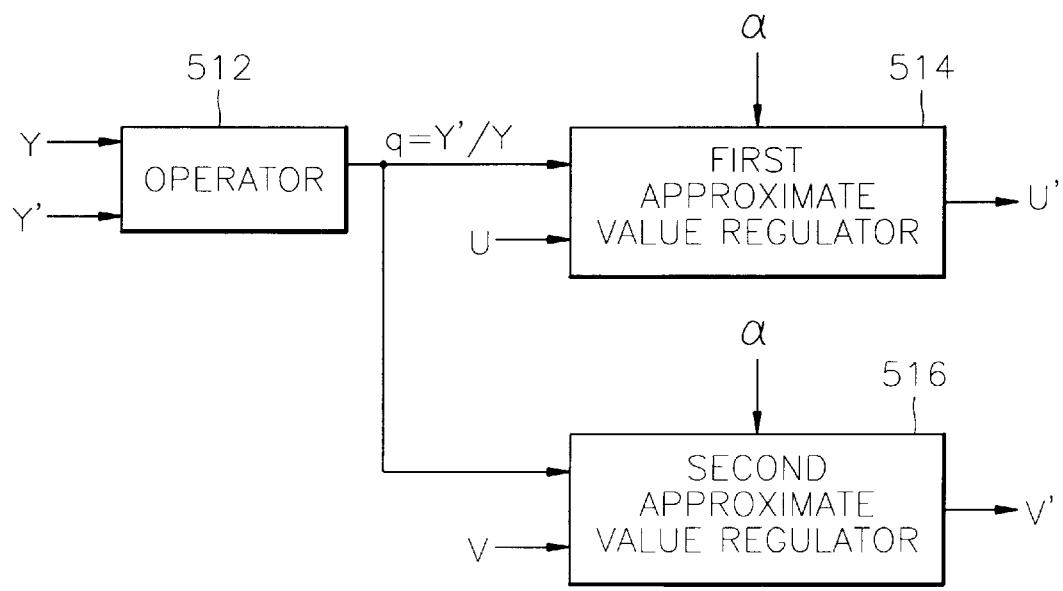
FIG. 13 is a detailed circuit diagram of the color compensator shown in FIG. 1 according to another embodiment of the present invention.

FIG. 13 is a detailed circuit diagram of the color compensator 500 shown in FIG. 1 according to another embodiment of the present invention, wherein an operator 512 operates a ratio (q) between a signal Y output by the first noise reducer 200 of FIG. 1 and a signal Y' output by the local contrast enhancer 400, i.e., the Y'/Y.

First approximate value regulators 514 and 516 are provided to prevent color compensation using the approximated compensating line shown in FIG. 11. The first approximate value regulator 514 receives the signal U output by the second noise reducer 220 of FIG. 1, the ratio (q) output by the operator 512, and a parameter (α), and outputs a signal U' compensated by the compensating line (R',G',B')=q(R,G, B) when the input signal U is between the minimum level and the a(=αb) level and outputs a signal U' compensated by the approximated compensating line (R',G',B')=A(R,G, B)+K when the input signal U is between the "a" level and the maximum level (Max).

At this time, the signal U can be compensated either by the compensating line (R',G',B')=q(R,G,B) or by the approximated compensating line (R',G',B')=A(R,G,B)+K, depending on the parameter value (α). That is, when the parameter value (α) is 1, the signal U is compensated by the compensating line (R',G',B')=q(R,G,B). When the parameter value (α) is greater than 0 and smaller than 1, the signal U being between the minimum level and the "a" (=αb) level is compensated by the compensating line (R',G',B')=q(R,G,B), and the signal U being between the "a" level and the maximum level is compensated by the approximated compensating line (R',G',B')=A(R,G,B)+K.

The second approximate value regulator 516 receives the signal V output by the third noise reducer 240 of FIG. 1, the ratio (q) output by the operator 512, and a parameter (α), and outputs a signal V' compensated by the compensating line (R',G',B')=q(R,G,B) when the input signal V is between the minimum level and the "a" level and outputs a signal V' compensated by the approximated compensating line (R', G',B')=A(R,G,B)+K when the input signal V is between the "a" level and the maximum level (Max).

Thus, the present invention is applicable to a wide-ranging field associated with image quality enhancement for an image signal. That is, the present invention can be applied to broadcasting apparatuses, radar signal processing systems, medical equipment, electric home appliances, etc.

As described above, the present invention, which considers a corrected value depending on the mean brightness of an input image and uses the mean-separate histogram equalization having the gain control function for preventing excessive enhancement, effectively reduces an abrupt change in brightness and an artifact generated during conventional histogram equalization, thereby enhancing a contrast and greatly improving the image quality of an input image. Furthermore, the present invention effectively removes impulse noise by increasing reliability through a dual impulse detecting method, thus improving the image quality. The image quality can also be enhanced through enhancement of a local contrast. Also, when a luminance is changed by a predetermined process for contrast enhancement, the present invention varies a color value according to the change, thereby providing an undistorted color signal.

What is claimed is:

1. An image quality enhancing circuit for enhancing image quality through a predetermined image processing on an input image signal, said circuit comprising:

noise reducing means for detecting an impulse for each of an input luminance signal and input color signals and outputting a trimmed mean of a predetermined size window when said impulse is detected, and otherwise, bypassing said input signals without change;

contrast enhancing means for equalizing a luminance signal of a picture unit output by said noise reducing means and outputting an enhanced luminance signal;

local contrast enhancing means for detecting a local contrast defined as a difference between the value of an input sample with respect to said enhanced luminance signal and each value obtained by low-pass filtering samples in a predetermined size window including the input sample, adaptively weighting said input sample value according to said detected local contrast, and outputting a changed luminance signal; and color compensating means for compensating said color signals output by said noise reducing means according to said changed luminance signal.

2. An image quality enhancing circuit as claimed in claim 1, further comprising:

a first color converter for converting an input RGB signal into a luminance signal and color signals and outputting the result to said noise reducing means; and a second color converter for outputting said luminance signal output by said local contrast enhancing means and said compensated color signal output by said color compensating means in RGB form.

3. An image quality enhancing circuit as claimed in claim 2, wherein said first color converter converts said input RGB signal into one of signals (Y, U, V), (Y, R-Y, B-Y), and (Y, I, Q).

4. An image quality enhancing circuit as claimed in claim 2, wherein said color compensating means comprises:

an operator for operating a ratio between the luminance signal output by said noise reducing means and the changed luminance signal output by said local contrast enhancing means; and regulators for receiving the color signals output by said noise reducing means, the ratio output by said operator, and a predetermined parameter and outputting compensated color signals by changing the value of the color signals using a predetermined compensating line.

5. An image quality enhancing circuit as claimed in claim 4, wherein, when the ratio between the luminance signal output by said noise reducing means and the changed luminance signal output by said local contrast enhancing means is given as q, said compensating line is expressed by following equation:

$$(R',G',B')=q(R,G,B).$$

6. An image quality enhancing circuit as claimed in claim 4, wherein, when the ratio between the luminance signal output by said noise reducing means and the changed luminance signal output by said local contrast enhancing means is given as q, said compensating line is expressed by following equation:

$$(R',G',B')=A(R,G,B)+K,$$

wherein A is $$\frac{q(1-\alpha)}{q-1},$$

K is $$\frac{(q-1)\alpha}{q-1}\text{Max},$$

$\alpha$ is greater than or equal to 0 and smaller than or equal to 1, $\alpha$ is a predetermined parameter, and Max is a maximum value.

7. An image quality enhancing circuit as claimed in claim 1, wherein said noise reducing means comprises a plurality of noise reducers for reducing impulse noise for said luminance signal and said color signals, respectively.

8. An image quality enhancing circuit as claimed in claim 1, wherein said noise reducing means comprises:

a first noise reducer for reducing impulse noise included in the input luminance signal;

a selector for selecting a signal from two input color signals;

a second noise reducer for reducing impulse noise included in the color signal selected by said selector; and a separator for separating the color signal whose noise is reduced by said second noise reducer into two types of color signals.

9. An image quality enhancing circuit as claimed in claim 8, wherein each of said noise reducers comprises:

a window generator for generating a plurality of different-sized windows including an input signal;

a plurality of outer value detectors for detecting a mean between a mean sample value for each window and an absolute deviation of samples and detecting whether an input signal has an outer value;

a selection control signal generator for generating a selection control signal when all of said input signals are detected to be outer values in said plurality of outer value detectors;

a trimmed mean filter for trimming an input signal using a trimming window of a predetermined size and outputting a trimmed mean; and a selector for outputting said trimmed mean as an output signal when an impulse component exists in said input signal according to said selection control signal and, otherwise, outputting said input signal as an output signal without change.

10. An image quality enhancing circuit as claimed in claim 6, wherein said window generator substitutes said input signal for an output signal in a recursive noise reduction mode according to a recursive/nonrecursive noise reduction mode signal and then generates a plurality of windows for a next input signal.

11. An image quality enhancing circuit as claimed in claim 9, wherein said window generator generates first and second windows each having a different size and including the input signal.

12. An image quality enhancing circuit as claimed in claim 11, wherein said plurality of outer value detectors comprise:

a first outer value detector for judging an impulse component to be included in an input signal when an absolute difference between the input signal and a mean sample value of said first window is greater than the mean of an absolute deviation of said first window multiplied by a parameter for predetermined noise reduction, and outputting a first outer value detecting signal; and a second outer value detector for judging an impulse component to be included in an input signal when an absolute difference between the input signal and a mean sample value of said second window is greater than the mean of an absolute deviation of said second window multiplied by the parameter for predetermined noise reduction, and outputting a second outer value detecting signal.

13. An image quality enhancing circuit as claimed in claim 9, wherein said trimming window uses one window among said plurality of windows.

14. An image quality enhancing circuit as claimed in claim 1, wherein said contrast enhancing means is comprised of a mean-separate histogram equalizer for independently equalizing a luminance signal of a picture unit output by said noise reducing means by obtaining a histogram of subimages divided on the basis of the mean value of said luminance signal.

15. An image quality enhancing circuit as claimed in claim 14, wherein said contrast enhancing means comprises:

first calculating means for receiving a noise-removed luminance signal output by said noise reducing means, in a picture unit, and calculating the distribution of a gray level;

second calculating means for receiving said noise-reduced luminance signal in a picture unit and calculating a mean level;

third calculating means for dividing said gray level distribution of the calculated picture unit into a predetermined number of subimages according to said mean level and calculating a cumulative density function for each subimage; and mapping means for mapping said noise-reduced luminance signal to a gray level according to said cumulative density function value calculated by each of said subimages and outputting an enhanced luminance signal.

16. An image quality enhancing circuit as claimed in claim 15, wherein said picture unit is a frame unit and said predetermined number is two.

17. An image quality enhancing circuit as claimed in claim 15, further comprising a frame memory for delaying said noise-reduced luminance signal in a frame unit in order to input a signal of the same frame as said cumulative density function calculated by said third calculating means to said mapping means.

18. An image quality enhancing circuit as claimed in claim 17, wherein said mapping means comprises:

a first mapper for mapping the luminance signal output by said frame memory to a gray level having a first range according to a corresponding cumulative density function value when said luminance signal output by said frame memory is a first subimage lower than or equal to the mean level;

a second mapper for mapping said luminance signal output by said frame memory to a gray level having a second range according to a corresponding cumulative density function value when said luminance signal output by said frame memory is a second subimage greater than said mean level;

a comparator for comparing said luminance signal output by said frame memory with said mean level and generating a selection control signal; and a selector for selecting said first mapper when said luminance signal output by said frame memory is said first subimage according to said selection control signal, and otherwise, selecting said second mapper.

19. An image quality enhancing circuit as claimed in claim 15, further comprising a buffer for renewing said cumulative density function calculated by said third calculating means in a picture unit and providing the cumulative density function value stored during the renewal to said mapping means.

20. An image quality enhancing circuit as claimed in claim 15, wherein said mapping means comprises:

a first mapper for mapping said noise-reduced luminance signal to a gray level having a first range according to a corresponding cumulative density function value when said noise-reduced luminance signal is a first subimage lower than or equal to the mean level;

a second mapper for mapping said noise-reduced luminance signal to a gray level having a second range according to a corresponding cumulative density function value when said noise-reduced luminance signal is a second subimage greater than said mean level;

a comparator for comparing said noise-reduced luminance signal with said mean level and generating a selection control signal; and a selector for selecting said first mapper when said noise-reduced luminance signal is said first subimage according to said selection control signal, and otherwise, selecting said second mapper.

21. An image quality enhancing circuit as claimed in claim 15, wherein said contrast enhancing means further comprises brightness compensating means for outputting a compensated mean level by adding a corrected value depending on a predetermined correction function to said mean level.

22. An image quality enhancing circuit as claimed in claim 21, wherein said brightness compensating means outputs a compensated mean level by adding a corrected value greater than zero to said mean level when said mean level is very small and by adding a corrected value lower than zero when said mean level is very large.

23. An image quality enhancing circuit as claimed in claim 21, wherein said mapping means comprises:
- a first mapper for mapping said noise-reduced luminance signal to a gray level from a minimum gray level to a compensated mean level ($B_m$) according to the cumulative density function value of a corresponding subimage when said noise-reduced luminance signal is lower than or equal to said mean level;
- a second mapper for mapping said luminance signal to a gray level from a changed compensated mean level ($B_m'$) to a maximum gray level ($X_{L-1}$) according to the cumulative density function value of a corresponding subimage when said luminance signal is greater than said mean level, wherein $B_m'$ equals $B_m+X_{L-1}/(L-1)$;
- a comparator for comparing said noise-reduced luminance signal with said mean level and generating a selection control signal; and
- a selector for selecting said first mapper when said noise-reduced luminance signal is said first subimage according to said selection control signal, and otherwise, selecting said second mapper.

24. An image quality enhancing circuit as claimed in claim 21, wherein said contrast enhancing means further comprises gain control means for controlling the gain of said enhanced luminance signal according to an amount of variation in gray level between said noise-reduced luminance signal and said enhanced luminance signal and the level of said noise-reduced luminance signal.

25. An image quality enhancing circuit as claimed in claim 24, wherein said gain control means controls the gain of said enhanced luminance signal on the basis of a Weber ratio.

26. An image quality enhancing circuit as claimed in claim 24, wherein said gain control means comprises:
- a subtracter for subtracting said noise-reduced luminance signal from said enhanced luminance signal and detecting a variation amount corresponding to the difference;
- a gain feature determiner for calculating a maximum bounding function value according to the level of said noise-reduced luminance signal to restrict enhancement of said noise-reduced luminance signal using a predetermined maximum bounding function;
- a selector for comparing said noise-reduced luminance signal with said mean level and selecting a first gain control parameter when said noise-reduced luminance signal is lower than or equal to said mean level and, otherwise, selecting a second gain control parameter;
- a multiplier for multiplying said maximum bounding function value by said gain control parameter selected by said selector and outputting a bounding function value;
- a limiter for comparing said bounding function value with said variation amount, limiting said variation amount according to the compared result, and outputting a limited variation amount; and
- an adder for adding said limited variation amount to said noise-reduced luminance signal.

27. An image quality enhancing circuit as claimed in claim 26, wherein said maximum bounding function $g(X_k)$ is $aX_k$ and a is a constant.

28. An image quality enhancing circuit as claimed in claim 26, wherein said maximum bounding function $g(X_k)$ is $a\sqrt{X_k}$ and a is a constant.

29. An image quality enhancing circuit as claimed in claim 26, wherein said limiter outputs said variation amount as said limited variation amount when an absolute value of said variation amount is lower than or equal to said bounding function value, and otherwise, outputs said bounding function value as said limited variation amount.

30. An image quality enhancing circuit as claimed in claim 24, wherein said gain control means comprises:
- a subtracter for subtracting said noise-reduced luminance signal from said enhanced luminance signal and detecting a variation amount corresponding to the difference;
- a gain feature determiner for calculating a maximum bounding function value according to the level of said noise-reduced luminance signal to restrict enhancement of said noise-reduced luminance signal using a predetermined maximum bounding function;
- a multiplier for multiplying said maximum bounding function value by a gain control parameter having a predetermined value and outputting a bounding function value;
- a limiter for comparing said bounding function value with said variation amount, limiting said variation amount according to the compared result, and outputting a limited variation amount; and
- an adder for adding said limited variation amount to said noise-reduced luminance signal.

31. An image quality enhancing circuit as claimed in claim 30, wherein said maximum bounding function $g(X_k)$ is $aX_k$ and a is a constant.

32. An image quality enhancing circuit as claimed in claim 30, wherein said maximum bounding function $g(X_k)$ is $a\sqrt{X_k}$ and a is a constant.

33. An image quality enhancing circuit as claimed in claim 30, wherein said limiter outputs said variation amount as said limited variation amount when an absolute value of said variation amount is lower than or equal to said bounding function value, and otherwise, outputs said bounding function value as said limited variation amount.

34. An image quality enhancing circuit as claimed in claim 1, wherein said local contrast enhancing means comprises:
- a window generator for generating an input sample with respect to an enhanced luminance signal output by said contrast enhancing means and generating a predetermined-sized window including said input sample;
- a low-pass filter for low-pass filtering the samples of said window generated by said window generator and outputting a low-pass filtered signal;
- a subtracter for subtracting said low-pass filtered signal from the input sample output by said window generator and generating a local contrast signal corresponding to a contrast which can be visually felt by a human being;
- an absolute value calculator for calculating an absolute value of said local contrast signal and detecting a region having high or low contrast;
- a weighting unit for adding a weighted value obtained by a predetermined weighting function to the output of said absolute value calculator;
- a first multiplier for multiplying the output of said weighting unit by a parameter for controlling an amount of local contrast enhancement;
- a second multiplier for multiplying said local contrast signal by the output of said first multiplier; and
- an adder for adding the output of said second multiplier to the input sample output by said window generator and outputting a changed luminance signal.

35. An image quality enhancing circuit as claimed in claim 34, wherein said weighting function enhances said local contrast signal when the absolute value of said local contrast signal is lower than a predetermined value and bypasses said local contrast signal without enhancement when the absolute value of said local contrast signal is greater than or equal to the predetermined value.

36. An image quality enhancing circuit as claimed in claim 1, wherein said color compensating means comprises:

an operator for operating a ratio between the luminance signal output by said noise reducing means and the changed luminance signal output by said local contrast enhancing means; and multipliers for multiplying the color signals output by said noise reducing means by the ratio output by said operator and outputting compensated color signals.

37. An image quality enhancing method for enhancing the image quality of an input image signal by performing a predetermined image processing on said input image signal, said method comprising the steps of:

(a) detecting an impulse for each of input luminance and color signals, outputting a trimmed mean of a predetermined-sized window when said impulse is detected, and bypassing said input signals when said impulse is not detected, thereby outputting noise-reduced luminance and color signals;

(b) receiving said noise-reduced luminance signal in a picture unit, equalizing said noise-reduced luminance signal, and outputting an enhanced luminance signal;

(c) detecting a local contrast defined as a difference between an input sample value with respect to said enhanced luminance signal and each value obtained by low-pass filtering samples of a predetermined-sized window including the input sample, and outputting a luminance signal changed by adaptively weighting the input sample value according to said detected local contrast; and (d) compensating said noise-reduced color signals according to said changed luminance signal and outputting compensated color signals.

38. An image quality enhancing method as claimed in claim 37, further comprising the steps of:

(e1) converting input RGB signals into a luminance signal and color signals and outputting the result before said step (a); and (e2) converting and outputting said changed luminance signal and said compensated color signal in RGB signal form after said step (d).

39. An image quality enhancing method as claimed in claim 38, wherein said RGB signal received in step (e1) is converted into one of signals (Y, U, V), (Y, R-Y, B-Y) and (Y, I, Q).

40. An image quality enhancing method as claimed in claim 37, wherein said step (a) comprises the substeps of:

(a1) generating a plurality of windows of different sizes including the input signal;

(a2) obtaining a mean sample value for each of said windows and a mean of an absolute deviation between samples;

(a3) detecting whether or not an impulse component exists in the input signal, using said obtained mean sample value of each window and said mean of the absolute deviation between samples; and (a4) outputting a trimmed mean by trimming the samples in a predetermined-sized trimming window when an impulse component is detected from said input signal, and otherwise, bypassing said input signal.

41. An image quality enhancing method as claimed in claim 40, wherein, when said impulse component is detected from said input signal in at least two windows in step (a3), it is judged that said impulse component exists in said input signal.

42. An image quality enhancing method as claimed in claim 40, wherein said trimming window is one of said plurality of windows.

43. An image quality enhancing method as claimed in claim 40, wherein said step (a) further comprises the step of (a5) replacing said input signal with said output signal, moving it to a next input signal, and returning to step (a1).

44. An image quality enhancing method as claimed in claim 37, wherein said step (b) comprises the substeps of:

(b1) receiving said noise-reduced luminance signal in a picture unit and calculating a mean level;

(b2) calculating a cumulative density function, based on gray level distribution, for every subimage divided on the basis of said calculated mean level; and (b3) outputting an enhanced luminance signal by performing independent histogram equalization with respect to each subimage on the basis of said cumulative density function value obtained for each of said subimages.

45. An image quality enhancing method as claimed in claim 44, wherein said noise-reduced luminance signal of a picture unit is divided into two subimages according to said mean level, in step (b2).

46. An image quality enhancing method as claimed in claim 44, wherein said step (b3) comprises the substeps of:

(b31) mapping the samples for each subimage to a gray level according to said cumulative density function value obtained for every subimage; and (b32) comparing the level of said noise-reduced luminance signal with said mean level and selecting one from said signals mapped to the gray level in each of said subimages, according to a compared result.

47. An image quality enhancing method as claimed in claim 46, further comprising the step of (b33) delaying said noise-reduced luminance signal in a picture unit and outputting said delayed signal to step (b32).

48. An image quality enhancing method as claimed in claim 44, wherein said step (b) further comprises the step of (b4) outputting a compensated mean level by adding a corrected value depending on a predetermined correcting function to said mean level.

49. An image quality enhancing method as claimed in claim 48, wherein, in step (b4), said compensated mean level is output by adding a corrected value greater than zero to said mean level when said mean level is very small, and by adding a corrected value lower than zero to said mean level when said mean level is very large.

50. An image quality enhancing method as claimed in claim 48, wherein said step (b3) comprises the substeps of:

(b31') mapping said noise-reduced luminance signal to a gray level from a minimum gray level to a compensated mean level ($B_m$) according to the cumulative density function value of a corresponding subimage when said noise-reduced luminance signal is lower than or equal to said mean level; and (b32') mapping said luminance signal to a gray level from a changed compensated mean level ($B_m'$) to a maximum gray level ($X_{L-1}$) according to the accumulative density function value of a corresponding subimage when said luminance signal is greater than said mean level, wherein $B_m'$ equals $B_m + X_{L-1}/(L-1)$.

51. An image quality enhancing method as claimed in claim 48, wherein said step (b) further comprises the step of (b5) controlling the gain of an enhanced signal according to an amount of gray level variation between said noise-reduced luminance signal and said enhanced luminance signal and the level of said noise-reduced luminance signal.

52. An image quality enhancing method as claimed in claim 51, wherein said gain control of said enhanced luminance signal is based on a Weber ratio, in step (b5).

53. An image quality enhancing method as claimed in claim 51, wherein said step (b5) comprises the substeps of:
(b51) subtracting said luminance signal from said enhanced signal and detecting an amount of variation corresponding to the difference;
(b52) calculating a limit enhancement amount of said luminance signal using a predetermined maximum bounding function and a predetermined gain control parameter;
(b53) comparing said limit enhancement amount with said variation amount, limiting said variation amount according to the compared result, and outputting a limited variation amount; and
(b54) adding said limited variation amount to said noise-reduced luminance signal.

54. An image quality enhancing method as claimed in claim 53, wherein said step (b52) comprises the substeps of:
(b521) calculating a maximum bounding function value according to the level of said noise-reduced luminance signal using a predetermined maximum bounding function in order to limit enhancement of said noise-reduced luminance signal; and
(b522) multiplying said maximum bounding function value by a predetermined gain control parameter and outputting a limit enhancement amount.

55. An image quality enhancing method as claimed in claim 54, wherein said predetermined gain control parameter comprises a plurality of gain control parameters for each divided subimage.

56. An image quality enhancing method as claimed in claim 54, wherein said predetermined gain control parameter comprises a gain control parameter which is commonly applied to said noise-reduced luminance signal.

57. An image quality enhancing method as claimed in claim 54, wherein said maximum bounding function $g(X_k)$ is $aX_k$ and a is a constant.

58. An image quality enhancing method as claimed in claim 54, wherein said maximum bounding function $g(X_k)$ is $a\sqrt{X_k}$ and a is a constant.

59. An image quality enhancing method as claimed in claim 53, wherein, in step (b53), said variation amount is output as said limited variation amount when an absolute value of said variation amount is lower than or equal to said limit enhancement amount, and otherwise, said limit enhancement amount is output as said limited variation amount.

60. An image quality enhancing method as claimed in claim 37, wherein said step (c) comprises the substeps of:
(c1) detecting a local contrast corresponding to a difference between an input sample value with respect to said enhanced luminance signal and each value obtained by low-pass filtering the samples in a predetermined-sized window including an input sample; and
(c2) adaptively weighting a weighted value depending on a predetermined weighting function to said input sample value according to said detected local contrast value.

61. An image quality enhancing method as claimed in claim 60, wherein said weighting function enhances said local contrast value when said detected local contrast value is lower than a predetermined value and bypasses said local contrast value without enhancement when said detected local contrast value is greater than or equal to the predetermined value.

62. An image quality enhancing method as claimed in claim 37, wherein said compensated color signal is changed in the same direction as that of said noise-reduced color signal, in step (d).

63. An image quality enhancing method as claimed in claim 37, wherein, in said step (d), said changed luminance signal forms a luminance plane changed in a color signal space, and luminance values of every color signal in said formed luminance plane are the same.

64. An image quality enhancing method as claimed in claim 63, wherein, in step (d), said compensated color signal is obtained by an intersecting point of a line linking the direction of said noise-reduced color signal with the changed luminance plane.

65. An image quality enhancing method as claimed in claim 64, wherein, when a ratio between said noise-reduced luminance signal and said changed luminance signal is given as q, said compensating line is expressed by following equation:

$$(R',G',B')=q(R,G,B).$$

66. An image quality enhancing method as claimed in claim 64, wherein, when a ratio between said noise-reduced luminance signal and said changed luminance signal is given as q, said compensating line is expressed by following equation:

$$(R',G',B')=A(R,G,B)+K,$$

wherein A is $$\frac{q(1-\alpha)}{q-1},$$

K is $$\frac{(q-1)\alpha}{q-1}\text{Max},$$

$\alpha$ is greater than or equal to 0 and lower than or equal to 1, $\alpha$ is a predetermined parameter, and Max is a maximum value.

* * * * *